(12) United States Patent
Alexander et al.

(10) Patent No.: US 9,698,843 B2
(45) Date of Patent: Jul. 4, 2017

(54) EXTRACTING PARAMETERS FROM A COMMUNICATIONS CHANNEL

(75) Inventors: Paul Dean Alexander, Crafers (AU); David Victor Lawrie Haley, Stepney (AU)

(73) Assignee: Cohda Wireless Pty. Ltd., Kent Town (AU)

( * ) Notice: Subject to any disclaimer, the term of this patent is extended or adjusted under 35 U.S.C. 154(b) by 0 days.

(21) Appl. No.: 13/511,663

(22) PCT Filed: Nov. 29, 2010

(86) PCT No.: PCT/AU2010/001599
§ 371 (c)(1),
(2), (4) Date: Sep. 21, 2012

(87) PCT Pub. No.: WO2011/063471
PCT Pub. Date: Jun. 3, 2011

(65) Prior Publication Data
US 2013/0114660 A1    May 9, 2013

(30) Foreign Application Priority Data
Nov. 27, 2009  (AU) ................................ 2009905828

(51) Int. Cl.
*H04B 3/46*    (2015.01)
*H04B 1/10*    (2006.01)
(Continued)

(52) U.S. Cl.
CPC ......... *H04B 1/1081* (2013.01); *H04B 17/327* (2015.01); *H04B 17/345* (2015.01);
(Continued)

(58) Field of Classification Search
None
See application file for complete search history.

(56) References Cited

U.S. PATENT DOCUMENTS

| 5,008,679 A * | 4/1991 | Effland | G01S 5/06 342/353 |
| 6,990,061 B2 * | 1/2006 | Deneire | H04L 25/022 370/203 |

(Continued)

FOREIGN PATENT DOCUMENTS

| EP | 1950923 | 7/2008 |
| WO | WO-2007022564 A1 | 3/2007 |

(Continued)

OTHER PUBLICATIONS

"International Application No. PCT/AU2010/001599, International Search Report and Written Opinion mailed Jan. 5, 2011", (Jan. 5, 2011), 8 pgs.

(Continued)

*Primary Examiner* — Adolf Dsouza
(74) *Attorney, Agent, or Firm* — Schwegman Lundberg & Woessner, P.A.

(57) ABSTRACT

A method for extracting a parameter of a communication channel from a channel estimate that characterizes the communication channel in terms of a frequency response over time. The method includes generating a set of feature identifiers that characterize features of the channel, for example energy peaks or troughs and determining the parameter, for example time delay of a multipath signal or frequency offset of a multipath signal, dependent on the feature identifiers. Methods using the parameter are also described including methods to estimate the environment.

15 Claims, 4 Drawing Sheets

(51) Int. Cl.
*H04L 25/02* (2006.01)
*H04L 1/20* (2006.01)
*H04B 17/327* (2015.01)
*H04B 17/345* (2015.01)
*H04B 17/364* (2015.01)
*H04B 17/373* (2015.01)
*H04B 17/391* (2015.01)

(52) U.S. Cl.
CPC ......... *H04B 17/364* (2015.01); *H04B 17/373* (2015.01); *H04B 17/391* (2015.01); *H04B 17/3913* (2015.01); *H04L 1/205* (2013.01); *H04L 25/022* (2013.01); *H04L 25/0204* (2013.01)

(56) References Cited

U.S. PATENT DOCUMENTS

| | | | | | |
|---|---|---|---|---|---|
| 2004/0259514 | A1* | 12/2004 | Nissila | ............... | H04L 1/0026 455/226.1 |
| 2006/0120440 | A1* | 6/2006 | Reial | ............... | H04B 1/7113 375/149 |
| 2009/0037503 | A1* | 2/2009 | Peng | ............... | G06F 17/141 708/207 |
| 2010/0309051 | A1* | 12/2010 | Moshfeghi | ............... | G01S 5/0236 342/378 |
| 2011/0076991 | A1* | 3/2011 | Mueck | ............... | H04L 1/0003 455/414.1 |
| 2012/0033763 | A1* | 2/2012 | Goh | ............... | H04L 25/0212 375/316 |
| 2013/0143595 | A1* | 6/2013 | Moshfeghi | ............... | G01S 5/0236 455/456.1 |

FOREIGN PATENT DOCUMENTS

| | | |
|---|---|---|
| WO | WO-2007095697 A1 | 8/2007 |
| WO | WO-2008040088 A1 | 4/2008 |
| WO | WO-2010144973 A1 | 12/2010 |

OTHER PUBLICATIONS

Abdulhamid, Harb, "Channel Estimation for 5.9 GHz DSRC Applications", PhD Thesis, University of Windsor, Canada, (2007), 1-95.

Lane, R. O., "Target detection in urban scenarios using netted radar multipath signals", Mathematics in Defence 2009, Farnborough, Hampshire, UK, (Nov. 19, 2009), 1-8.

Wymeersch, Henk, et al., "Cooperative Localization in Wireless Networks", Proceedings of the IEEE, vol. 97, No. 2, (Feb. 2009), 427-450.

"European Application No. 10832433.6, Extended European Search Report dated Mar. 6, 2015", (Mar. 6, 2015), 10 pgs.

Stuber, Gordon L., et al., "Broadband MIMO-OFDM Wireless Communications", Proceedings of the IEEE, vol. 92, No. 2, IEEE, New York, Feb. 1, 2004, pp. 271-294, (Feb. 1, 2004), 271-294.

"European Application No. 10832433.6, Office Action mailed Oct. 14, 2016", 5 pgs.

"Australian Application No. 2015264959, Examination Report No. 1 dated Feb. 2, 2017", (Feb. 2, 2017), 3 pgs.

* cited by examiner

EXTRACTING PARAMETERS FROM A COMMUNICATIONS CHANNEL

PRIORITY CLAIM TO RELATED APPLICATIONS

This application is a national stage application under 35 U.S.C. §371 of PCT/AU2010/001599, filed Nov. 29, 2010, and published as WO 2011/063471 A1 on Jun. 3, 2011, which claims priority to Australian Application No. 2009905828, filed Nov. 27, 2009, which applications and publication are incorporated by reference as if reproduced herein and made a part hereof in their entirety, and the benefit of priority of each of which is claimed herein.

FIELD OF THE INVENTION

The present invention relates to the field of communications. In particular the present invention relates to the extraction of parameters from an estimate of a communications channel.

It will be convenient to hereinafter describe the invention in relation to systems and methods incorporating an IEEE 802.11 OFDM physical channel, although embodiments of the present invention may find application in systems operating in accordance with other standards, or in proprietary communications systems, and the present invention should not be limited to that exemplary use.

BACKGROUND OF THE INVENTION

Figure 1:
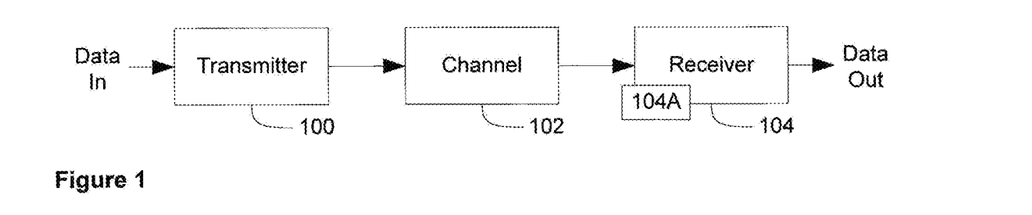
FIG. 1: is a schematic drawing of a communications system.

Communication systems may be represented in terms of a transmitter 100 and receiver 104, separated by a channel 102, as shown in FIG. 1. The transmitter transforms the data into a signal suitable for transmission over the channel. For the purposes of determining the transmitted data, the goal of the receiver 104 is to remove the effects of the channel distortions from the signal and to obtain an estimate of the data. The receiver 104 may also provide other information, such as a measure of received power, received signal samples and/or an estimate of the channel.

The channel 102 represents the effects induced by the communications channel. The channel 102 may distort the transmitted signal in some way. Channel distortions may include amplitude distortions, frequency offsets, phase offsets, Doppler effects, distortions resulting from multipath channels, additive noise or interference.

Spatial parameters pertaining to the transmitter 102 and/or receiver 104 devices may be known. Such parameters may include spatial coordinates, velocity, and acceleration. For example, the devices may be positioned at known fixed locations. Spatial parameters may also be obtained from a Global Positioning System (GPS) receiver or similar device. Furthermore, spatial information relating to the transmitter 102 may be passed to the receiver 104 within the transmitted data content. An example of such a case occurs in Dedicated Short Range Communications (DSRC) systems, where transmitted data may include position, speed, acceleration and heading information, as described in SAE International, "Dedicated Short Range Communications (DSRC) Message Set Dictionary," J2735, December 2006. Spatial information pertaining to system components, and receiver information such as an estimate of the channel, may be used to detect, track and characterise objects in the environment surrounding a wireless communications system, as described in co-pending international patent application PCT/AU2010/ 000768 filed on 28 Jun. 2010, the contents of which are incorporated herein by reference.

Reference to any prior art in the specification is not, and should not be taken as, an acknowledgement or any form of suggestion that this prior art forms part of the common general knowledge in any other jurisdiction or that this prior art could reasonably be expected to be ascertained, understood and regarded as relevant by a person skilled in the art.

SUMMARY OF THE INVENTION

The present invention provides methods for extracting parameters from an estimate of the communications channel represented in the frequency domain.

In one aspect of the invention, an apparatus is provided for extracting/generating parameters from a communications channel estimate. The apparatus includes an input to receive at least one estimate of the channel, a channel parameter calculator to generate at least one parameter for the communications channel based on the inputs and an output for providing at least one channel parameter. The invention also relates to a method for extracting parameters characterising multipath effects in a communication channel.

The generated parameter may characterise multipath effects in the communications channel. The channel parameter calculator may extract a relative delay of multipath components from the channel estimate. The channel parameter calculator may extract a relative frequency offset of multipath components from the channel estimate.

The channel parameter calculator may measure the spacing of adjacent features of the same type, such as peaks (high power) and troughs (low power), in the frequency domain channel. The spacing indicate time and/or frequency spacing of the features. The channel parameter calculator may extrapolate a feature in order to determine the time and/or frequency spacing.

In some embodiments, tap delay difference and frequency offset parameters are calculated across either the full duration of a channel estimate, across some section of a channel estimate and/or at intervals through a channel estimate.

In some embodiments the channel parameter calculator operates on multiple input channel estimates that are provided in time and/or frequency domain. In some embodiments, the channel parameter calculator receives multiple input channel estimates from a plurality of antennas.

In some embodiments the calculator generates parameter values using multiple inputs separated in time and interpolates one or more features between consecutive inputs.

In some embodiments the channel parameter calculator combines parameters values calculated from a plurality of inputs received.

In some embodiments, the channel parameter calculator uses the slope of one or more features of the frequency domain channel, and one dimension of feature spacing (frequency or time), to calculate the other dimension of feature spacing. Feature slope may be measured using a single feature or some combination of features across one or more channel estimate inputs.

In one example use, the outputs from said channel parameter calculator may be used to improve receiver performance.

The communication channel may comprise at least two inflectors and/or at least two transmitters so that a first and second set of feature identifiers are generated and further parameters determined dependent on each set of feature identifiers.

The present invention also provides a method and apparatus for generating an environment estimate of a communication channel. Expressed as a method, the invention includes receiving at least one estimate of the communication channel in the form of a frequency response over a period of time, identifying from the frequency response a measure of time delay and frequency offset arising from multipath effects in the communication channel and computing at least one location of an object in the environment that caused said multipath effects from the measure of time delay and frequency offset.

Further aspects and embodiments of the invention will be apparent from the following description and/or from the accompanying Figures.

BRIEF DESCRIPTION OF THE DRAWINGS

Embodiments of the present invention will now be described with reference to the drawings, in which.

DETAILED DESCRIPTION OF THE EMBODIMENTS

Embodiments of a channel parameter calculator are described that allow parameters to be extracted from an estimate of the communications channel.

The channel estimate may be provided by the receiver or some other component of the communications system. The channel estimate is in the frequency domain and includes one or more channel estimate samples over some duration of time. Receivers and associated processing systems for receiving signals, and computing a frequency domain representation of the signal over a period of time are well known and will not therefore be described in any detail herein. Additional techniques for generating a frequency domain channel estimate are described in International (PCT) Applications PCT/AU2006/001201, PCT/AU2007/000231 and PCT/AU2007/001506 published under WIPO publication numbers WO 2007/022564 A1, WO 2007/095697 A1, WO 2008/040088 A1 (respectively), the contents of which are incorporated herein by reference.

The channel estimate may be measured or modelled, for example using techniques known to those skilled in the art. The channel estimate may also be evaluated by a group of system components working together, e.g. performing a channel sounding algorithm or other techniques known to those skilled in the art. The channel estimate may be an exact representation of the channel.

The techniques for channel parameter extraction described herein have potential application to:

Wireless communications systems, e.g. DVB-T, DVB-H, IEEE 802.11, IEEE 802.16, 3GPP2, Dedicated Short Range Communications (DSRC), Communications Access for Land Mobiles (CALM), and proprietary systems;

Satellite communications systems; and

Wired communications systems, e.g. ADSL, HomePlug.

In a wireless communications link, a signal is transmitted from transmitter (Tx) 100 to receiver (Rx) 104. By way of example, in a Dedicated Short Range Communications (DSRC) system, the transmitter (Tx) 100 and receiver (Rx) 104 may be included in an infrastructure Road Side Unit (RSU), or On Board Unit (OBU) in a vehicle.

The presence of objects in the environment surrounding the transmitter 100 and receiver 104 may lead to multiple signal paths arriving at the receiver. Objects in the environment may be either stationary or mobile. The transmitted signal may be inflected by the objects in the environment, e.g. through reflection or diffraction. Example inflectors include vehicles, signs, buildings or other structures within the environment, which may be equipped with transmitters and/or receivers themselves.

The transmitter 100 includes an input for receiving information for transmission, a modulator and an antenna system for transmitting the modulated signal over the channel 102. Similarly the receiver 104 includes an antenna system for receiving the modulated signal, a demodulator, and an information processing system 104A, such as a microprocessor and associated memory, for receiving the demodulated information and performing various processing functions on the information as required for the particular receiver implementation. The transmitter 100 and receiver 104, may include other components such as power and data distribution components, filters and amplifiers. Various transmitters and receivers suitable for transmission in the bandwidths and using the communication protocols described above are well known.

Figure 2:
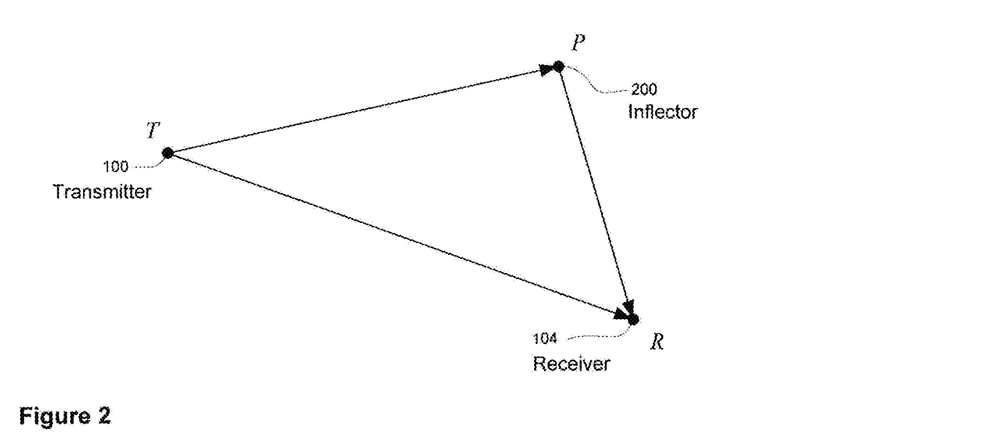
FIG. 2: is a representation of an example environment with a two path channel.

FIG. 2 shows an example environment with an inflector 200 inducing a two path channel between the transmitter 100 and receiver 104, where:

T is a point in three-dimensional space representing the position of the transmitter 100;

R is a point in three-dimensional space representing the position Of the receiver 104;

P is a point in three-dimensional space representing the position of the signal inflector 200.

In other examples there may be multiple transmitters and/or multiple inflectors inducing multipath effects.

In one arrangement, the following parameters are extracted from the channel estimate:

Relative delay, of multipath components; and

Relative frequency offset of multipath components.

Figure 3:
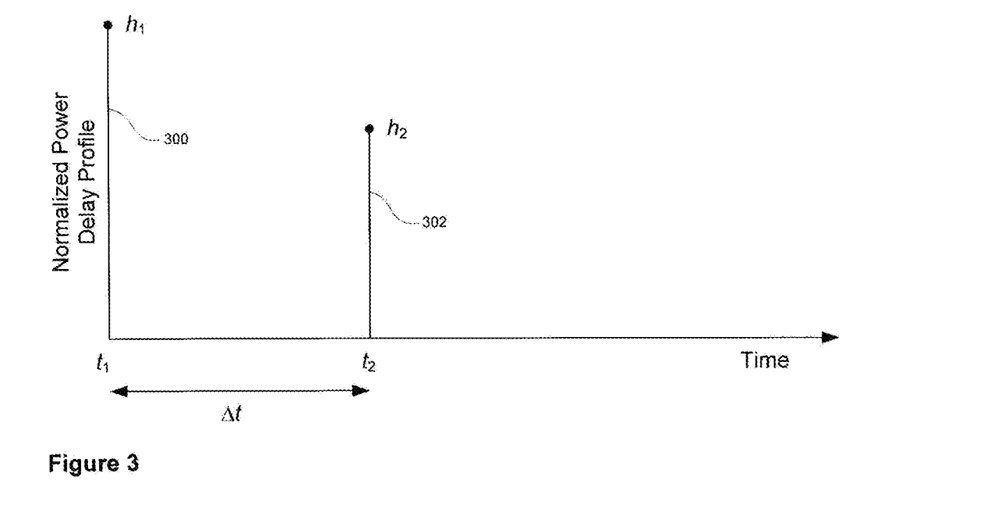
FIG. 3: is an example time domain channel corresponding to FIG. 2.

FIG. 3 shows an example channel estimate, $\hat{h}$, in the time domain (with normalised power delay profile) corresponding to the environment of FIG. 2. The direct path corresponds to channel tap $h_1$ 300 at time, $t_1$. The inflected path corresponds to channel tap $h_2$ 302 at delay $t_2$. In this example $h_2$ 302 has lower power relative to tap $h_1$ 300 due to increased propagation loss (as the inflected path is longer than the direct path) and attenuation at the point of inflection 200. The relative tap delay is $\Delta t=t_2-t_1$. The instantaneous phase, and rate of change of phase, of taps $h_1$ 300 and $h_2$ 302 may also differ.

Relative mobility can result in a relative frequency offset, $\Delta f$, of the inflected path. The relative frequency offset may be determined from the channel estimate, $\hat{h}$, as the rate of change of phase of time domain tap $\hat{h}_2$ 302 relative to that of tap $\hat{h}_1$ 300.

Figure 4:
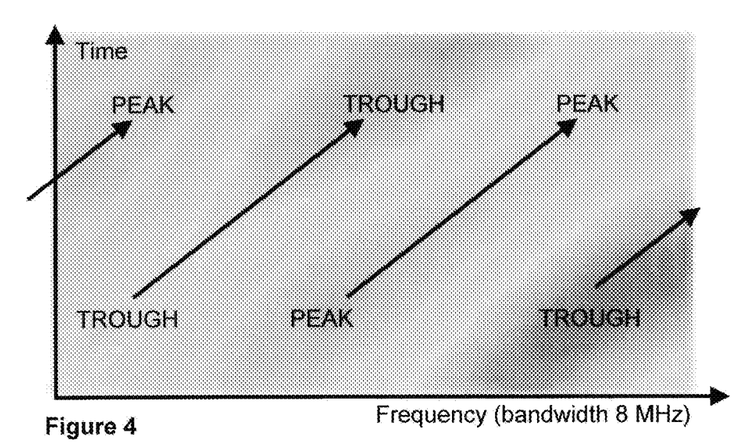
FIG. 4: is an example frequency domain channel estimate corresponding to a single packet and including identified features of the channel estimate.

As mentioned above, for the purposes of channel parameter extraction, the channel estimate, $\hat{h}$, is provided in the frequency domain. In this case multipath channel components can induce frequency selective fading. FIG. 4 shows an example channel estimate corresponding to a single packet, obtained from a receiver 104 during field trials, as described in the previously mentioned and incorporated international patent application PCT/AU2006/001201. The vertical axis is time, and corresponds to exactly one packet duration. The horizontal axis is frequency and has bandwidth 8 MHz.

Figure 5:
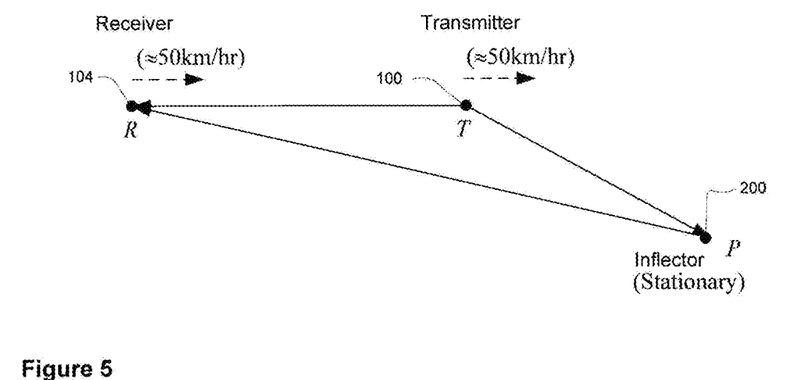
FIG. 5: is a configuration of system components with a single receiver, transmitter and inflector, corresponding to the example frequency domain channel estimate of FIG. 4.

The field trial was performed in an open environment, i.e. no buildings were present. The example channel was captured when system components were configured as shown in FIG. 5. The transmitter 100 was mounted in a vehicle travelling at approximately 50 km/h, being followed at approximately the same speed by a vehicle hosting the receiver 104. The inflector 200 was a third vehicle parked on the roadside.

The frequency domain channel estimate in FIG. 4 exhibits frequency selective fading features such as peaks (high power) and troughs (low power). The spacing between features varies with the inverse of relative path difference. Mobility induced Doppler causes the features to move across the frequency band during reception of the packet.

Four feature identifiers (in this example linear arrows) have been superimposed on the channel estimate shown in FIG. 4 to characterize the location and orientation of features of the channel estimate. The arrows labeled PEAK represent regions of relatively high power and the arrows labeled TROUGH represent regions of lower power. In some embodiments, to form the feature identifiers, the channel estimate is formed and displayed to a human operator, who selects the relevant feature (e.g. a peak or trough in the energy). A line is then fitted with a slope that tracks the movement of the feature as it shifts across the band over time. This line may be a best fit computed by the observation processor 802 or a line entered by the human operator using a computer user interface, based on a visual inspection of the channel estimate. In this example, the arrows have a diagonal orientation, which indicates that the identified features shift across the band over time. The diagonal lines are extrapolated by the observation processor 802 or human operator to extend beyond the rectangle defined by the packet length and bandwidth.

Figure 9:
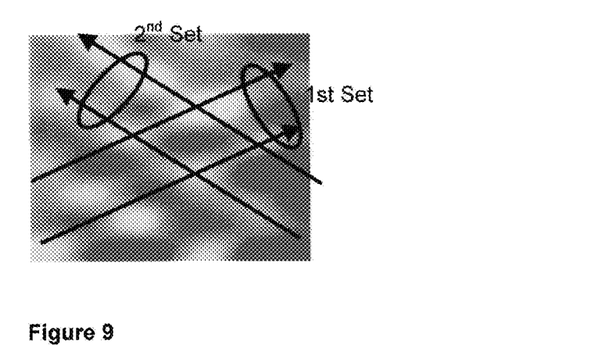
FIG. 9: is an example of a channel estimate with two sets of feature identifiers.

In other more general examples there may be multiple transmitters and/or multiple inflectors. In such cases there will be a more complex pattern of features in the channel estimate. For instance, a second pattern of power peak and trough features may be superimposed on the channel estimate in the example of FIG. 4. Feature identifiers (for example a second set of arrows) may be generated to characterise the second pattern. The second set of arrows may, for example, be oriented at a different angle to the arrows shown in FIG. 4 and may have a different spacing between adjacent features as shown in the example of FIG. 9.

The methods described below also apply where there are multiple sets of feature identifiers. Parameters may be extracted to characterise each set of feature identifiers.

In one arrangement, the channel parameter calculator measures the frequency spacing, $F_d$, of adjacent features of the same type in the frequency domain channel, e.g. adjacent peaks or troughs. The relative delay, $\Delta t$, is then calculated as follows:

$$\Delta t = \frac{1}{F_d} \tag{Eq. 1}$$

The channel parameter calculator measures the time spacing, $T_d$, of adjacent features of the same type in the frequency domain channel, e.g. adjacent peaks or troughs. The relative frequency offset, $\Delta f$, is then calculated as follows:

$$\Delta f = \frac{1}{T_d} \tag{Eq. 2}$$

Figure 6:
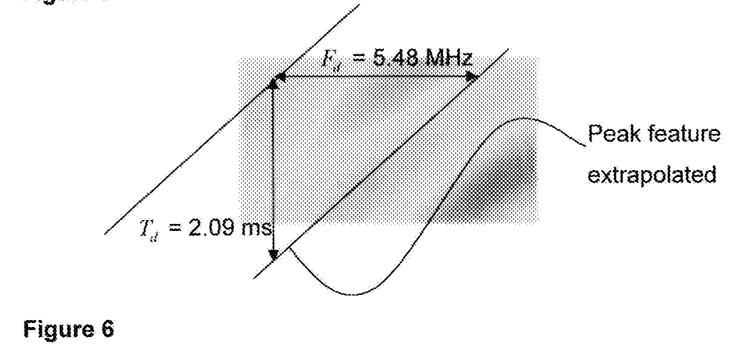
FIG. 6: is a diagram showing an example of extracted channel parameters, ie time and frequency spacing between adjacent peaks in the example frequency domain channel estimate of FIG. 4.

For the case of the channel estimate shown in FIG. 4 the frequency spacing between adjacent peaks is $F_d$=5.48 MHz, as shown in FIG. 6. The channel parameter calculator therefore calculates and outputs relative delay $\Delta t$=183 ns. The time spacing between adjacent peaks is $T_d$=2.09 ms, also shown in FIG. 6. The channel parameter calculator therefore calculates and outputs relative frequency offset $\Delta f$=478 Hz. The channel parameter calculator may extrapolate a feature identifier in order to determine the time and/or frequency spacing. This is shown in FIG. 6 in the case of determining the time spacing between adjacent peaks.

Tap delay difference and frequency offset parameters may be calculated across the full duration of a channel estimate or some section thereof and/or at intervals.

In another embodiment the channel parameter calculator calculates a plurality of values for one or more parameters. For each parameter, the channel parameter calculator then outputs at least one of:

Each calculated parameter value;
The maximum calculated parameter value;
The minimum calculated parameter value;
The average parameter value, taken across all calculated parameter values;
The average value, taken across a subset of calculated parameter values;
Some statistic relating to calculated parameter values, e.g. variance;
Some combination of the above.

In another embodiment the channel parameter calculator generates parameter values according to time and/or frequency feature spacing for multiple features, e.g. repeating peaks and/or troughs.

In another embodiment the channel parameter calculator operates on multiple input channel estimates that are provided in time and/or frequency domain.

In another embodiment the channel parameter calculator receives multiple input channel estimates from a plurality of antennas.

Figure 7:
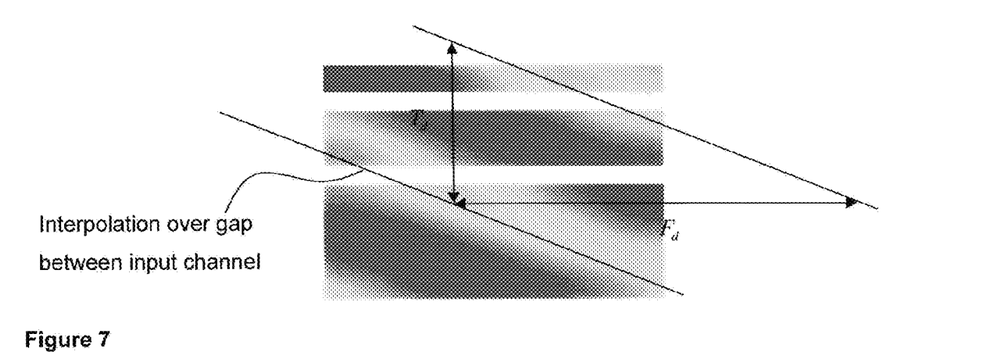
FIG. 7: is a diagram showing time and frequency spacing between adjacent trough's in an example set of channel estimate inputs, including interpolation over gaps in time between consecutive inputs.

In another embodiment the calculator generates parameter values using multiple inputs separated in time. The inputs may be multiple Channel estimates that are time-stamped so that the channel parameter calculator can account for variations with time evident over the multiple channel estimates. For example, the multiple channel estimates may arise from the sequential transmission of different packets. In such arrangements the channel parameter calculator may interpolate one or more features between consecutive inputs in order to determine the time and/or frequency spacing. The example in FIG. 7 shows three sequential channel estimates with time gaps between inputs. The feature identifiers (ie the diagonal lines) are interpolated over the gaps in time between consecutive inputs, in the case of determining the time and frequency spacing between adjacent troughs.

In another embodiment the channel parameter calculator combines parameter values calculated from a plurality of inputs received.

In another embodiment parameter values are combined over some window. Inputs in the window may be selected spatially or according to time. Combination may be performed by filtering values over the window according to some function. Example functions include:

Performing a block average over the window;
Combining a selection of samples from the window; and/or
Performing an auto-regression over the window;

In another embodiment, the channel parameter calculator measures the slope, e.g dF/dt, of one or more features of the frequency domain channel. Using the feature slope and one dimension of feature spacing (either frequency $F_d$ or time $T_d$) the channel parameter calculator may then calculate the other dimension of feature spacing as follows:

Time spacing, e.g according to $$T_d = \frac{F_d}{dF/dt};$$

or

Frequency spacing, e.g. according to $$F_d = \frac{dF}{dt/T_d}.$$

Feature slope may be measured using a single feature or some combination of features across one or more channel estimate inputs.

In another embodiment inputs are also accompanied with statistical information, with such information being employed by the channel parameter calculator to generate one or more statistics on the output parameters.

The channel parameter calculator may be run online as inputs become available, or run offline by post processing input data that was collected prior to its execution.

Outputs from the channel parameter calculator may be used in conjunction with spatial information pertaining to components of a wireless communications system to detect, track and characterise objects in the environment surrounding said wireless communications system. This use of the channel parameter calculator is summarised below and described in more detail in the previously mentioned and incorporated co-pending international patent application PCT/AU2010/000768.

Figure 8:
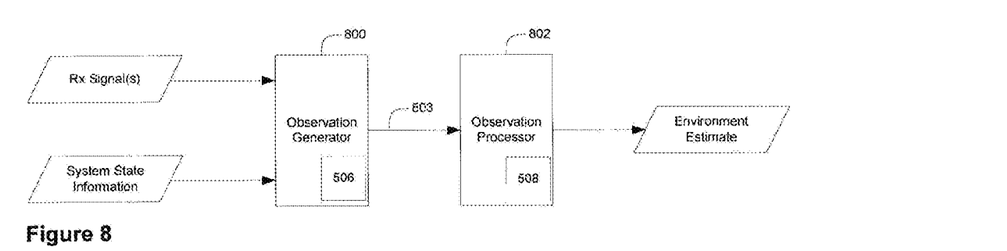
FIG. 8: is a schematic drawing of an environment estimator that may use the extracted channel parameter to generate an estimate of the environment of the communication channel.

FIG. 8 shows a block diagram for an embodiment of the environment estimator. One or more received signals are input to an observation generator 800, which includes an observation constructor 506. System state information (SSI) may also be input to the observation generator 800. The observation generator 800 outputs one or more observations 803 to the observation processor 802. Observations 803 includes an estimate of the communications channel, along with other information from the receiver 104 and system state information. The observation processor 802 then processes the observations and outputs an estimate of the environment. For example, the environment estimate may include position estimates for one or more inflectors in the environment. The channel parameter calculator may be used by the observation processor 802 to generate parameters such as channel tap delay and/or frequency offset for use during observation processing. The channel parameter calculator described herein is denoted 508 in FIG. 8 and may be a functional module of the observation processor 802.

The system state information (SSI) pertains to the transmitter 100, receiver 104 and/or the environment and may include information selected from the set:

Position;
Speed;
Acceleration;
Heading;
Elevation;
Time of transmission or reception;
Transmit power level;
Receive power level;
Signal to Noise Ratio (SNR);
Location of system components, such as antennas;
Structure of the host:
  Size, type, of host. For example, if the transmitter 100 or receiver 104 are mounted in a vehicular host, this information may include:
    Type of vehicle;
    Size of vehicle;
    Material with which host is constructed.
Other information known to about the environment. For example:
  The presence of an obstacle and information relating to the obstacle, such as the location of the obstacle, obtained for example from an automotive radar system;
  Temperature and weather conditions, and/or information allowing such conditions to be estimated, e.g. vehicle windscreen wiper rate;
  rain sensor information;
  sun sensor information;
  Map data, e.g. indicating location of structures and roads;
Information available from automotive controller-area network (CAN) bus;
Statistical confidence estimates for any of the above.

The observation constructor 506 is provided with receiver information from the receiver 104 and the transmitter, for example received signal samples. The observation constructor 506 forms an observation 803 from the available receiver information and system state information. The observation is denoted herein Ω[i], where i is the observation index, and may include:

T[i] the point ($x_T[i]$, $y_T[i]$, $z_T[i]$) representing the position of the transmitter 100;
R[i] the point ($x_R[i]$, $y_R[i]$, $z_R[i]$) representing the position of the receiver 104;
$\vec{v}_T[i]$ the instantaneous velocity vector for the transmitter 100;
$\vec{v}_R[i]$ the instantaneous velocity vector for the receiver 104;

ĥ[i] a channel estimate;
τ[i] Time of the observation;
the received signal;
other system state information, as described above.

The observation index in square brackets is henceforth used to denote values taken directly from Ω[i] or derived from information in Ω[i].

Each observation Ω[i] is passed to the observation processor 802. Observations may be grouped to avoid duplication of common, components. An example where such grouping may be used is if multiple antennas provide multiple channel estimates for the same received packet with common SSI pertaining to the transmitter. The observation processor 802 may receive observations generated by system components that are collocated with and/or part of the receiver 104. The observation processor 802 may also receive observations from system components elsewhere in the environment, e.g. at another physically separated receiver, and transferred to the observation processor e.g. using wireless communications.

The received signal in the environment of FIG. 2 is a combination of:
The transmitted waveform from the direct path from the transmitter 100; and
The signal that propagates from transmitter 100 to inflector 200, then from inflector 200 to receiver 104.

A first constraint on the location of the signal inflector 200 is therefore:

$$P = T + L_{TP}\vec{u}_{TP} = R - L_{PR}\vec{u}_{PR} \quad \text{(Eq. 3)}$$

In which:
T is a point representing the position of the transmitter 100;
R is a point representing the position of the receiver 104;
P is a point representing the position of the signal inflector 200;
$\vec{v}_T$ is the instantaneous velocity vector for the transmitter 100;
$\vec{v}_R$ is the instantaneous velocity vector for the receiver 104;
$\vec{v}_P$ is the instantaneous velocity vector for the signal inflector 200;
$\overline{TR}$ is the vector from point T to R;
$\overline{TP}$ is the vector from point T to P and
$\overline{PR}$ is the vector from point P to R.

$$\bar{u}_{TP} = \frac{(P-T)}{\|P-T\|_2}$$

is the unit vector in the direction of $\overline{TP}$;

$$\bar{u}_{PR} = \frac{(R-P)}{\|R-P\|_2}$$

is the unit vector in the direction of $\overline{PR}$;
$L_{TP} = \|\overline{TP}\|_2$ is the distance between points T and P;
$L_{PR} = \|\overline{PR}\|_2$ is the distance between points P and R; and
$L_{TR} = \|\overline{TR}\|_2$ is the distance between points T and R.
where $\|\cdot\|_2$ denotes the L2 Norm.

Assuming propagation at the speed of light, c, $\Delta t_{12}$ relates to the path length difference between the direct and inflected paths, providing a second constraint:

$$L_{TP} + L_{PR} - L_{TR} = \Delta t_{12} c \quad \text{(Eq. 4)}$$

$\Delta t_{12}$ is et described above with reference to Eq. 1 and is determined by the parameter calculator 508 as described above.

Given locations of the transmitter 100 T, and receiver 104 R, the length of the direct path $L_{TR}$ is determined geometrically.

Figure 10:
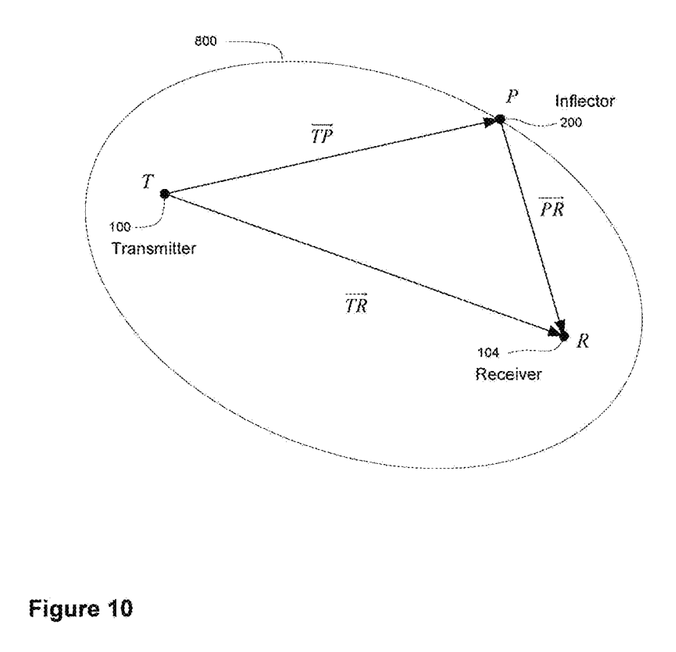
FIG. 10: is a diagrammatic representation of a process for characterising an environment of a communication channel.

Combining the first and second constraints enables the observation processor 802 to infer that the signal inflector 200 is placed on the loci of the ellipse 800, shown in FIG. 10, having foci at the transmitter, 100 T, and receiver 104, R. Point P is the actual location of the inflector in the example.

The frequency offset of the inflected path, Δf (see Eq. 2 above) provides a third constraint:

$$\vec{v}_T \cdot \bar{u}_{TP} + (\vec{v}_P - \vec{v}_R) \cdot \bar{u}_{PR} = -c\frac{\omega}{\omega_0} \quad \text{(Eq. 5)}$$

Where:
c is the speed of light;
$\omega_0$ is the centre frequency of the transmitted signal;
∪ denotes vector dot product.

Further constraints may be derived from Eqs. 2-5 by differentiating with respect to time, making use of velocity and/or acceleration from system state information where applicable.

In one arrangement, assuming the inflector is stationary, i.e. $\|v_P\|=0$, the observation processor 802 determines one or more feasible inflector locations, P, by solving the constraints in the following system of equations:

$$T + L_{TP}\bar{u}_{TP} = R - L_{PR}\bar{u}_{PR}$$

$$L_{TP} + L_{PR} - L_{TR} = \Delta t_{12} c$$

$$\vec{v}_T \cdot \bar{u}_{TP} + \vec{v}_R \cdot \bar{u}_{PR} = -c\frac{\omega}{\omega_0}$$

$$\|\bar{u}_{TP}\|_2 = 1$$

$$\|\bar{u}_{PR}\|_2 = 1,$$

By representing $P = T + L_{TP}\vec{u}_{TP} = R - L_{PR}\vec{u}_{PR}$ the above system is quadratic (in $\vec{u}_{TP}$ and $\vec{u}_{PR}$). The solution may be obtained using techniques apparent to those skilled in the art, for example the Newton-Raphson method. Note that it is only required to solve either for $L_{TP}$ and $\vec{u}_{TP}$, or $L_{PR}$ and $\vec{u}_{PR}$, i.e. one of these pairs can be eliminated if desired, e.g. to reduce computational complexity.

The system yields four solutions, two imaginary and two real. Each of the real solutions corresponds to feasible choices of P, consistent with the input observation. The observation processor 802 may:
Output all feasible choices of P;
Increase the total number of constraints to resolve the ambiguity, using additional observations, for example:
In time, e.g. reception of another packet;
In space, e.g. another antenna; and/or
In space and time, e.g. reception of another packet from a different transmitter.
Create a hypothesis on inflector location $\hat{P}[k] = P[i] + \vec{v}_P(\tau[k] - \tau[i])$ at time r[k], and test whether this hypothesis satisfies one or more of the constraints using an observation taken at time τ[k], e.g. $L_{TP}[k] + L_{PR}[k] - L_{TR}[k] = \Delta t_{12}[k]c$.

In another embodiment, outputs from the channel parameter may be used to improve receiver performance. For example, channel tap delay and/or frequency offset of multipath components may be used to equalise channel effects and improve demodulator performance, via techniques such as those described in the previously mentioned and incorporated international patent applications PCT/AU2007/000231 and PCT/AU2007/001506.

The functional modules described herein, for example the channel parameter calculator, may be implemented in hardware, for example application-specific integrated circuits (ASICs). Other hardware implementations include, but are not limited to, field-programmable gate arrays (FPGAs), structured ASICs, digital signal processors and discrete logic. Alternatively, the functional modules may be implemented as software, such as one or more application programs executable within a computer system. The software may be, stored in a computer-readable medium and be loaded into a computer system from the computer readable medium for execution by the computer system. A computer readable medium having a computer program recorded on it is a computer program product. Examples of such media include, but are not limited to CD-ROMs, hard disk drives, a ROM or integrated circuit. Program code may also be transmitted via computer-readable transmission media, for example a radio transmission channel or a networked connection to another computer or networked device.

It will be understood that the invention disclosed and defined in this specification extends to all alternative combinations of two or more of the individual features mentioned or evident from the test of the drawings. All these different combinations constitute various alternative aspects of the invention.

The invention claimed is:

1. An apparatus for extracting parameters from a communications channel estimate of a communications channel between a transmitter and a receiver, the apparatus, comprising:
an input to receive at least one estimate of the communications channel in the form of a frequency response over a period of time;
a channel parameter calculator to extract at least one channel parameter for the communications channel based on the channel estimate, the at least one channel parameter being different from the channel estimate;
an observation processor that receives from the channel parameter calculator a measure of time delay difference between taps and frequency offset difference between the taps arising from multipath effects in the communications channel and determines, based on said measure, a location of an object in an environment of the communications channel that caused said multipath effects, the multipath effects arising from different communication paths from the transmitter to the receiver; and
an output to output the at least one channel parameter and/or the location.

2. The apparatus of claim 1, wherein the generated parameter characterises multipath effects in the communications channel.

3. The apparatus of claim 1, wherein the channel parameter calculator extracts a relative delay of multipath components from the channel estimate.

4. The apparatus of claim 1, wherein the channel parameter calculator extracts a relative frequency offset of multipath components from the channel estimate.

5. The apparatus of claim 1, wherein the channel parameter calculator measures the spacing of adjacent features of the same type in the frequency domain channel.

6. The apparatus of claim 5, wherein the features are selected from the group: peaks (high power) and troughs (low power).

7. The apparatus of claim 5, wherein the channel parameter calculator extrapolates a said feature beyond the period of time.

8. The apparatus of claim 7, wherein the channel parameter calculator extrapolates a said feature over a gaps in time between consecutive inputs in which a said frequency response has not been received at the input.

9. An environment estimator for generating an estimate of the environment of a communications channel between a transmitter and a receiver, the environment estimator comprising a computational system configured to:
receive at least one estimate of the communications channel in the form of a frequency response over a period of time;
identify from the frequency response a measure of time delay difference between taps and frequency offset difference between the taps arising from multipath effects in the communications channel, the multipath effects arising from different communication paths between the transmitter and receiver; and
compute at least one location of an object in the environment that caused said multipath effects from the measure of time delay and frequency offset.

10. A method for extracting at least one parameter characterising multipath effects in a communications channel defined by at least one transmitter, at least one receiver and at least one inflector, the method comprising:
obtaining a channel estimate that characterises the communications channel in the form of a frequency response over time;
extracting based on the channel estimate a set of feature identifiers that characterise features of the channel estimate arising from different communication paths from the at least one transmitter to the at least one receiver, the features being different from the channel estimate and including time delay difference between taps and frequency offset difference between the taps;
determining the least one parameter dependent on the plurality of feature identifiers; and
determining a location of the inflector based on the at least one parameter.

11. The method of claim 10, wherein the set of feature identifiers characterise power peaks and troughs in the channel estimate.

12. The method of claim 10, wherein the communications channel comprises a further inflector or a further transmitter and the method comprises:
generating a second set of feature identifiers that characterise features of the channel estimate arising from further communication paths due to the further transmitter or further inflector; and
determining a least one further parameter dependent on the second set of feature identifiers.

13. A method for generating an environment estimate of a communications channel between a transmitter and a receiver, the method comprising:
receiving at least one estimate of the communications channel in the form of a frequency response over a period of time;
identifying from the frequency response a measure of time delay difference between taps and frequency offset difference between the taps arising from multipath effects in the communications channel, the multipath effects arising from different communication paths from the transmitter to the receiver; and computing at least one location of an object in the environment that caused said multipath effects from the measure of time delay and frequency offset.

14. The method of claim 13, wherein the measure of time delay and frequency offset is identified by a process comprising:

locating a plurality of feature identifiers in the frequency response; and measuring the time and frequency separation of the feature identifiers.

15. The method of claim 14, wherein the method comprises extrapolating the feature identifiers in the frequency response beyond said period of time facilitate measurement of the time and frequency separation of the feature identifiers.

* * * * *

UNITED STATES PATENT AND TRADEMARK OFFICE
CERTIFICATE OF CORRECTION

PATENT NO. : 9,698,843 B2
APPLICATION NO. : 13/511663
DATED : July 4, 2017
INVENTOR(S) : Alexander et al.

Page 1 of 3

It is certified that error appears in the above-identified patent and that said Letters Patent is hereby corrected as shown below:

Delete Drawing Sheet 3 of 4 and replace with attached Drawing Sheet 3 of 4, consisting of new FIG. 8

In Column 2, Line 51, delete "parameters" and insert --parameter-- therefor

In Column 3, Line 37, delete "trough's" and insert --troughs-- therefor

In Column 4, Line 55, delete "Of" and insert --of-- therefor

In Column 4, Line 62, delete "delay," and insert --delay-- therefor

In Column 4, Line 67, delete "time," and insert --time-- therefor

In Column 6, Line 67, delete "Channel" and insert --channel-- therefor

In Column 7, Line 41-43, delete " $F_d = \dfrac{dF}{dt/T_d}.$ " and insert

-- $F_d = \dfrac{dF/dt}{T_d}.$ --

In Column 9, Line 10, delete "common," and insert --common-- therefor

Signed and Sealed this
Second Day of April, 2019

Andrei Iancu
*Director of the United States Patent and Trademark Office*

In Column 9, Line 45, delete "P" and insert --P;-- therefor

In Column 10, Line 1, delete "et" and insert --Δt-- therefor

In Column 10, Line 40, delete "$\|\bar{u}_{PR}\|_2 = 1,$" and insert --$\|\bar{u}_{PR}\|_2 = 1$-- therefor In Column 10, Line 64, delete "r[k]," and insert --T[k],-- therefor In Column 10, Line 66-67, delete "$L_{TP}[k]+L_{PR}[k]-L_{TR}[k]-\Delta t_{12}[k]c.$" and insert --$L_{TP}[k]+L_{PR}[k]-L_{TR}[k]=\Delta t_{12}[k]c.$--

In Column 11, Line 18, delete "be," and insert --be-- therefor